United States Patent [19]
Kawabata et al.

[11] 3,927,328
[45] Dec. 16, 1975

[54] DOSIMETRY METHOD

[75] Inventors: Hidetsugu Kawabata, Neyagawa; Tadaoki Yamashita, Hirakata, both of Japan

[73] Assignee: Matsushita Electric Industrial Co., Ltd., Osaka, Japan

[22] Filed: Nov. 20, 1973

[21] Appl. No.: 417,574

Related U.S. Application Data

[63] Continuation of Ser. No. 195,082, Nov. 2, 1971, abandoned.

[30] Foreign Application Priority Data

Nov. 18, 1970  Japan............................... 45-102281
Nov. 18, 1970  Japan............................... 45-102282

[52] U.S. Cl. ........... 250/473; 250/472; 252/301.4 S
[51] Int. Cl...... G01t 1/11; C09r 11/14; C09r 11/46
[58] Field of Search............... 252/301.4 S, 301.4 R; 250/472, 473

[56] References Cited
UNITED STATES PATENTS 3,772,206  11/1973  Hitomi et al................. 252/301.4 R

FOREIGN PATENTS OR APPLICATIONS 43-4499    2/1968  Japan........................ 252/301.4 S
1,569,245  5/1969  France....................... 252/301.4 S

*Primary Examiner*—Jack Cooper
*Attorney, Agent, or Firm*—Stevens, Davis, Miller & Mosher

[57] ABSTRACT

A thermoluminescence dosimeter which includes thermoluminescence phosphor comprising sodium sulfate as the host material and activator selected from the group consisting of dysprosium, holmium, thulium and terbium in an amount of $3 \times 10^{-5}$ to $1 \times 10^{-2}$ gram-atoms with respect to 1 mol of sodium sulfate. This thermoluminescence dosimeter is higher in sensitivity and more excellent in energy response characteristic than prior art thermoluminescence dosimeter and can be used to measure gamma radiation by exposing it to said radiation, heating it to about 300° C and measuring the luminescence emission.

2 Claims, 4 Drawing Figures

DOSIMETRY METHOD

This is a continuation application of Ser. No. 195,082 filed on Nov. 2, 1971, now abandoned.

This invention relates to a thermoluminescence dosimeter, and provides a dosimeter which is high in sensitivity and excellent in energy response characteristic.

A thermoluminescence dosimeter, in which is utilized for dosimetry such a thermoluminescence phenomenon that a certain substance emits luminescence when heated after irradiation with ionizing radiation, is particularly useful for the quantitative measurement and evaluation of radiation dose.

As conventional thermoluminescent phosphors, there have been known lithium fluoride (LiF), lithium borate ($Li_2B_4O_7$), beryllium oxide (BeO), calcium sulfate ($CaSO_4$) and calcium fluoride ($CaF_2$). Among these, LiF and $Li_2B_4O_7$:Mn are characterized in that they are successfully usable for the quantitative measurement of a radiation dose absorbed by the tissue. That is, the said phosphors are close in effective atomic number to the tissue, and hence have such merit that they are excellent in energy response characteristic. These phosphors, however, are not satisfactory in sensitivity, and hence have been desired to be improved from the practical standpoint.

On the other hand, $CaSO_4$, and $CaF_2$ are high in sensitivity, and hence have advantageously been used for measuring a low radiation dose, but have had such drawback as being inferior in energy response characteristic.

The present invention provides a thermoluminescence dosimeter which is not only high in sensitivity but also excellent in energy response characteristic, and thus is entirely free from the above-mentioned drawbacks. That is, the present invention is based on the fact that a substance, which is obtained by heating at a high temperature a mixture comprising sodium sulfate and at least one of dysprosium (Dy), terbium (Tb), holmium (ho) and thulium (Tm) in an amount of $3 \times 10^{-5}$ to $1 \times 10^{-2}$ gram-atoms with respect to 1 mol of sodium sulfate, has excellent characteristics as a phosphor for thermoluminescence dosimeter.

The production procedure and the structure of the phosphor for thermoluminescence dosimeter according to the present invention are explained in detail below.

High purity anhydrous sodium sulfate ($Na_2SO_4$) is sufficiently mixed with a small amount of dysprosium oxide ($Dy_2O_3$). In place of said $Dy_2O_3$, there may be used a halide or sulfate of Dy. The mixture is placed in a quartz- or alumina-made boat or crucible, and heated at 850° to 1,000°C for 3 to 5 hours in air or in an oxygen atmosphere. Subsequently, the mixture is gradually cooled to obtain crystalline anhydrous sodium sulfate as a transparent crystal. This crystal is cut into a definite size, or is ground, whereby a dosimeter phosphor is obtained. The resulting grains are sealed in a glass tube or molded by use of a binder, whereby a dosimeter element is obtained. In order to attain excellent characteristics as a dosimeter phosphor, it is essential to use $Na_2SO_4$ as a main material and to dope the $Na_2SO_4$ with a small amount of such dopant as Dy or the like.

The characteristics of the thus obtained phosphor are evaluated according to the thermoluminescence glow curves mentioned below.

Figure 1:
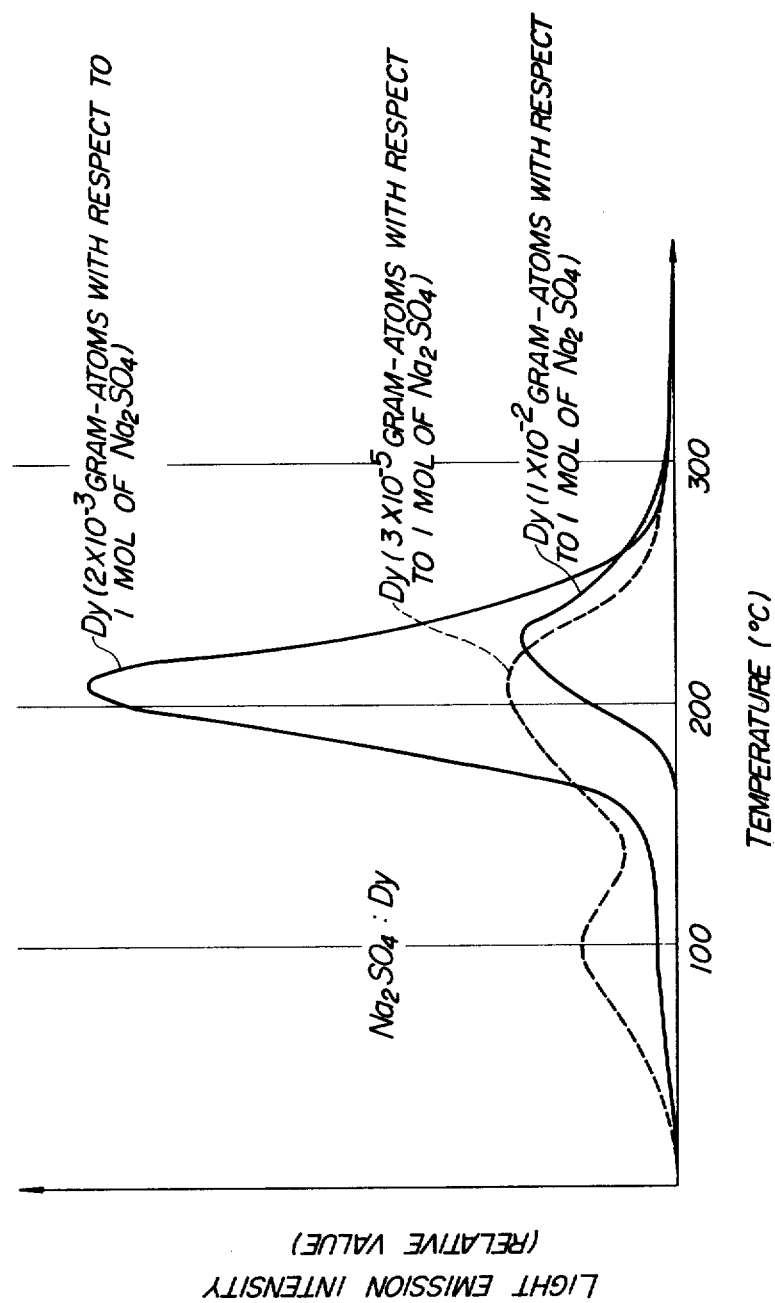
FIG. 1 is a drawing showing the glow curves of $Na_2SO_4$:Dy.

FIG. 1 is concerned with a $Na_2SO_4$:Dy phosphor prepared by heating at 900°C for 3.5 hours a mixture comprising sodium sulfate and dysprosium, and shows the glow curves (curves showing the relation between temperature and thermoluminescence) of said phosphor when irradiated with γ-rays in a dose of 1 roentgen. In case the amount of doped dysprosium (Dy) is $2 \times 10^{-3}$ gram-atoms with respect to 1 mol of sodium sulfate (0.1 mole % in terms of dysprosium oxide), the glow curve thereof is a simple curve having a peak at 200°C, as shown in the drawing.

The relation between the amount of doped dysprosium and the sensitivity of the resulting phosphor is such that the sensitivity increases with increasing amount of dysprosium within the range from $3 \times 10^{-5}$ to $1 \times 10^{-3}$ gram-atoms with respect to 1 mol of sodium sulfate, but does not increase even when the amount is made more than $1 \times 10^{-3}$ gran-atoms with respect to 1 mol of sodium sulfate and rather lowers when the amount is more than $1 \times 10^{-2}$ gram-atoms with respect to 1 mol of sodium sulfate. If the amount of dysprosium is smaller, a second peak is formed at a lower temperature side (100°C) than the main peak, and if the amount is more than $1 \times 10^{-2}$ gram-atoms, the glow curve becomes a curve having a broad peak tailing to the high temperature side, as shown in FIG. 1. The optimum amount of dysprosium to be doped is in the range from $1 \times 10^{-3}$ to $3 \times 10^{-3}$ gram-atoms with respect to 1 mol of sodium sulfate, but a practically usable phosphor can be obtained so far as the amount of dysprosium is in the aforesaid range, i.e. in the range from $3 \times 10^{-5}$ to $1 \times 10^{-2}$ gram-atoms with respect to 1 mol of sodium sulfate.

In the above, a phosphor prepared by doping $Na_2SO_4$ with Dy has been mentioned, but a phosphor similar in characteristics to the $Na_2SO_4$:Dy phosphor can be obtained also in the case where any one of Ho, Tb and Tm is used in place of Dy. The amounts and optimum amounts of these minor elements are identical with those of said Dy.

Figure 2:
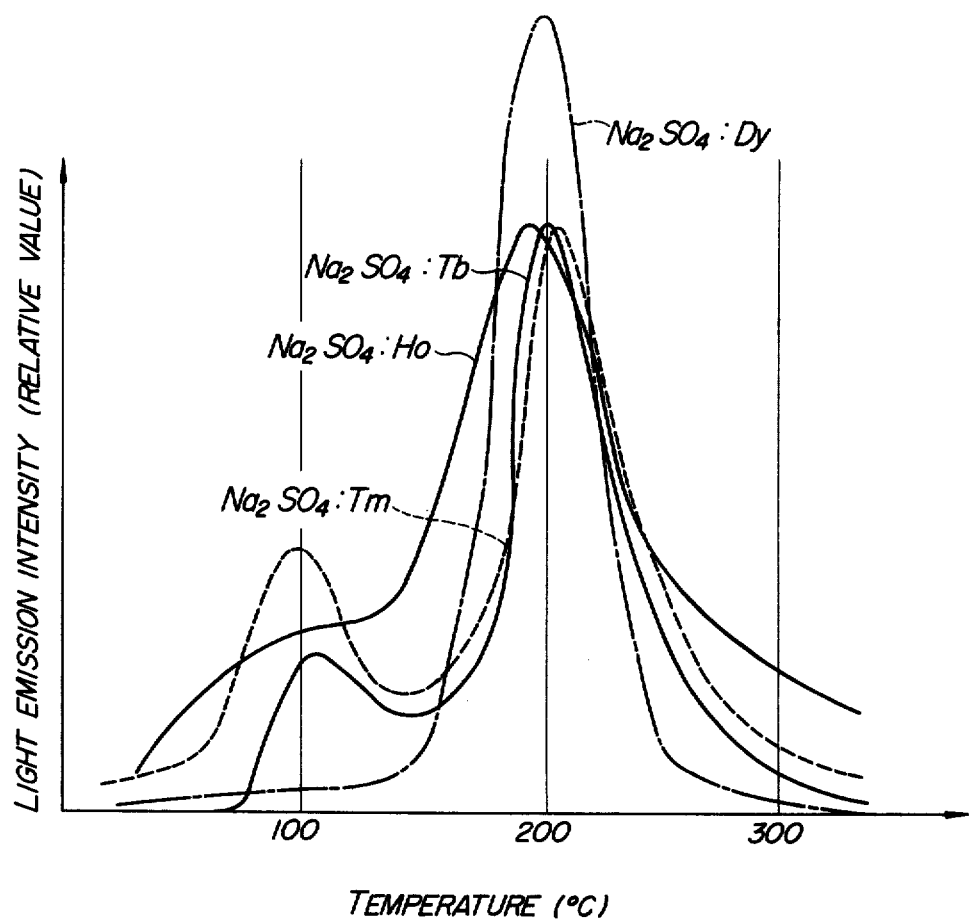
FIG. 2 is a drawing showing the glow curves of $Na_2SO_4$:Ho, $Na_2SO_4$:Tb and $Na_2SO_4$:TM.

FIG. 2 shows the glow curves of phosphors obtained by doping $Na_2SO_4$ with $2 \times 10^{-3}$ gram-atoms with respect to 1 mol of $Na_2SO_4$ of each of Ho, Tb and Tm. As is clear from the drawing, the $Na_2SO_4$:Dy phosphor is highest in sensitivity, but the phosphors $Na_2SO_4$:Ho, $Na_2SO_4$:Tb and $Na_2SO_4$:Tm are also favorable in sensitivity.

Supplemental conditions required in preparing the phosphors of the present invention are mentioned below.

In the first place, there is a question concerning the atmosphere employed for the heat treatment of the starting mixture. In case the heat treatment is effected in a reducing atmosphere, the resulting phosphor is deteriorated in sensitivity, so that it is desirable to carry out the heat treatment in air or in an oxygen atmosphere. When the heat treatment is carried out in an oxygen atmosphere, there is obtained a phosphor which is slightly higher in sensitivity than a phosphor obtained in the case where the heat treatment is effected in air.

In the next place, the heat treatment temperature also affects the characteristics of the resulting phosphor. It is preferable that the heat treatment is effected at a temperature in the range from 850° to 1,000°C. If the heat treatment is carried out at above 1,000°C, the resulting phosphor is lowered in sensitivity, while if the heat treatment is carried out at below 850°C, the resulting phosphor is not only lowered in sensitivity, but also comes to show a glow curve different in shape from that shown in the drawing, and thus is not suitable for use in a dosimeter.

Figure 3:
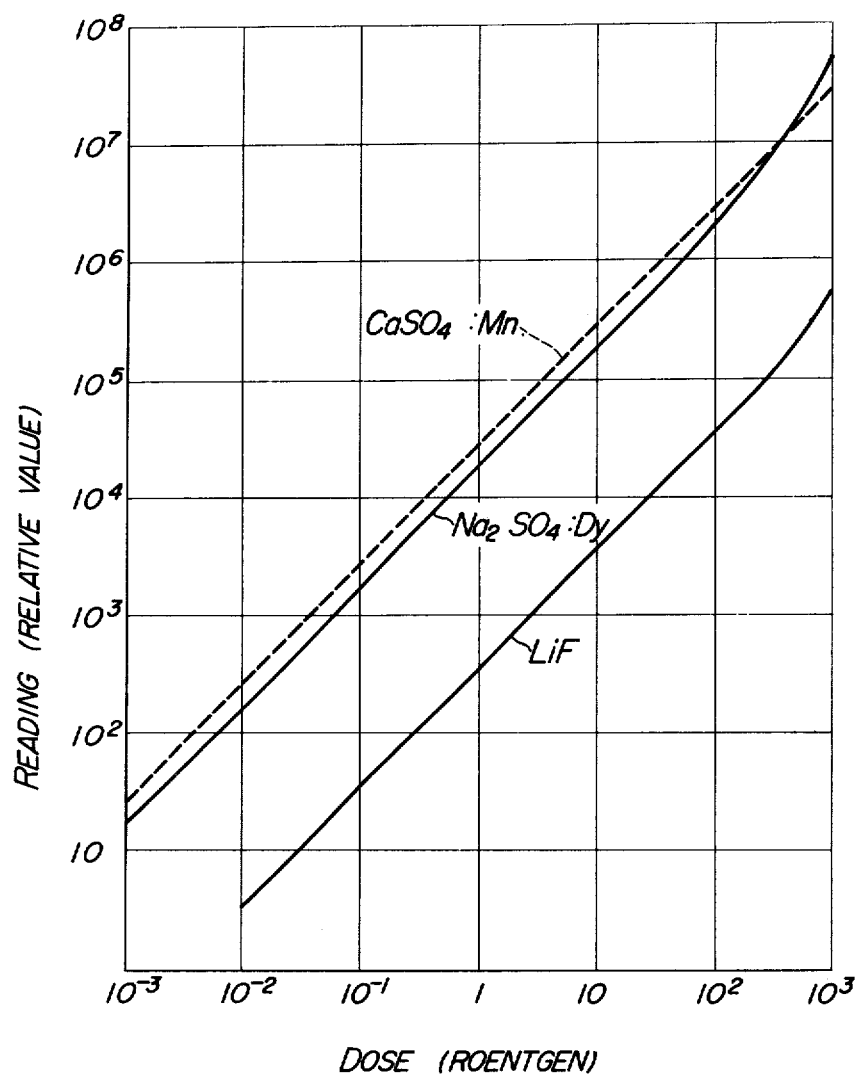
FIG. 3 is a drawing showing the relation between the exposure and the reading of $Na_2SO_4$:Dy.

FIG. 3 is an example showing the relation between the dose and the sensitivity of a $Na_2SO_4$:Dy phosphor sealed in a glass ampoule. For comparison, data concerning $CaSO_4$:Mn and LiF phosphors are also shown in the drawing. From FIG. 3, it is understood that the sensitivity of the $Na_2SO_4$:Dy phosphor is about 100 times the sensitivity of the LiF phosphor.

Figure 4:
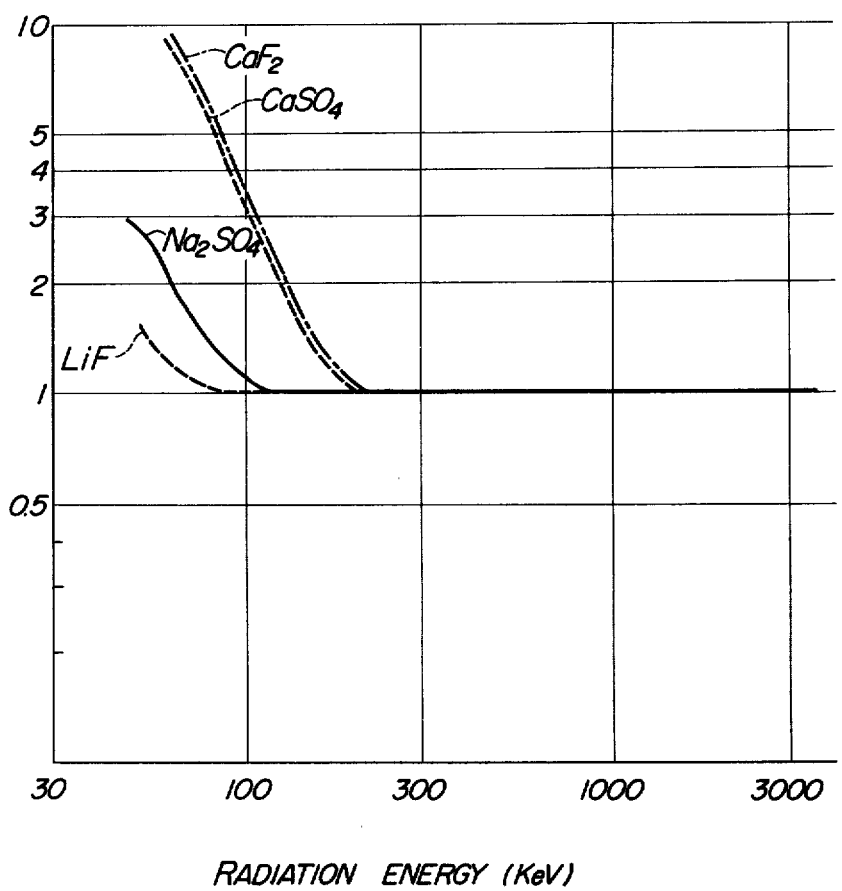
FIG. 4 is a drawing showing a comparison in energy characteristics of various dosimeter phosphors.

FIG. 4 shows a comparison in energy response characteristics of $Na_2SO_4$, $CaSO_4$, LiF and $CaF_2$. As seen in FIG. 4, $CaF_2$ and $CaSO_4$ are extremely inferior in said characteristic when the energy is less than 200 KeV, whereas $Na_2SO_4$ is favorable. In addition, $Na_2SO_4$ is excellent in fading and the like characteristics which are required for aa dosimeter phosphor, and thus can be successfully put into practical use.

What is claimed is:

1. A dosimetry method comprising
   exposing a thermoluminescent dosimeter including a thermoluminescent phosphor comprising sodium sulfate as the host material and at least one activator selected from the group consisting of dysprosium, holmium, thulium and terbium in an amount of $3 \times 10^{-5}$ to $1 \times 10^{-2}$ gram-atoms with respect to 1 mol of sodium sulfate to gamma radiation,
   heating the radiated dosimeter to about 300°C,
   measuring the luminescence emission and quantitatively relating the radiation incident thereon.

2. The dosimetry method of claim 1 wherein the amount of activator is $1 \times 10^{-3}$ to $3 \times 10^{-3}$ gram-atoms with respect to 1 mol of sodium sulfate.

* * * * *